US011236266B2

(12) United States Patent
Sun et al.

(10) Patent No.: US 11,236,266 B2
(45) Date of Patent: Feb. 1, 2022

(54) BREAKING A FRACTURING FLUID TO PROP A FRACTURE IN A SUBTERRANEAN FORMATION

(71) Applicant: Halliburton Energy Services, Inc., Houston, TX (US)

(72) Inventors: Hong Sun, Houston, TX (US); Janette Montalvo, Porter, TX (US); Linping Ke, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/724,838

(22) Filed: Dec. 23, 2019

(65) Prior Publication Data

US 2021/0189223 A1    Jun. 24, 2021

(51) Int. Cl.
    *E21B 43/267*     (2006.01)
    *C09K 8/68*     (2006.01)
    *C09K 8/80*     (2006.01)
    *C09K 8/60*     (2006.01)

(52) U.S. Cl.
    CPC ............... *C09K 8/68* (2013.01); *C09K 8/601* (2013.01); *C09K 8/80* (2013.01); *E21B 43/267* (2013.01); *C09K 2208/04* (2013.01); *C09K 2208/26* (2013.01)

(58) Field of Classification Search
    CPC .......... C09K 8/601; C09K 8/80; E21B 43/267
    See application file for complete search history.

(56) References Cited

U.S. PATENT DOCUMENTS

| | | | | |
|---|---|---|---|---|
| 2009/0107681 | A1* | 4/2009 | Hough | C09K 8/68 166/308.3 |
| 2009/0209438 | A1* | 8/2009 | Thieme | C09K 8/602 507/219 |
| 2013/0105154 | A1* | 5/2013 | Vorderbruggen | C09K 8/805 166/271 |
| 2013/0324445 | A1* | 12/2013 | Quintero | C09K 8/90 507/211 |
| 2018/0148635 | A1* | 5/2018 | Shen | C09K 8/80 |

FOREIGN PATENT DOCUMENTS

WO      2018022079 A1      2/2018

* cited by examiner

*Primary Examiner* — Silvana C Runyan
(74) *Attorney, Agent, or Firm* — McGuireWoods LLP (57) ABSTRACT

Methods of treating a subterranean formation. A pad fluid is introduced into a wellbore penetrating the subterranean formation to create or enhance one or more fractures in the subterranean formation. A fracturing fluid is introduced into the wellbore. The fracturing fluid includes a polymer having a hydrophobic monomer and a hydrophilic monomer. The fracturing fluid further includes a proppant and a second aqueous base fluid. The fracturing fluid does not include a crosslinker or an oxidative breaker. The fracturing fluid is broken thereby settling the proppant in the fracture.

14 Claims, 7 Drawing Sheets

BREAKING A FRACTURING FLUID TO PROP A FRACTURE IN A SUBTERRANEAN FORMATION

TECHNICAL FIELD

The present disclosure relates generally to wellbore operations, and more particularly, to hydraulic fracturing operations utilizing a fracturing fluid that does not require crosslinkers or oxidizing breakers.

BACKGROUND

Hydrocarbon producing formations may be stimulated by hydraulic fracturing treatments. In traditional hydraulic fracturing operations, a fracturing fluid (e.g., pad fluid, proppant-laden fluid, etc.) is pumped at a rate and pressure sufficient to create or enhance one or more fractures in the formation. The closure stress of the subterranean formation may collapse the formed fractures unless they are propped. Proppant particulates may be carried into the fractures with a fracturing fluid to maintain conductive channels for hydrocarbons to flow after the fracturing operation has concluded.

In order to suspend and transport proppant, the fracturing fluid should maintain a sufficient viscosity to enable these functions. This sufficient viscosity may be achieved by crosslinking a fracturing fluid polymer. This crosslinked fluid should maintain stability in the fracture for a desired time. The fluid may then be broken to allow the fluid to flow back out of the fracture. Timing the crosslinking of the polymer in order to minimize both the pumping pressure and also the breaking of the crosslinked polymer to occur before flow back but after the desired stable time may be a difficult operation to manage. Further, the variability of wellbore conditions can further complicate this operation. The present disclosure provides improved methods and compositions for treating formations through the use of fracturing fluids that do not require crosslinkers or oxidizing breakers.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to hydraulic fracturing operations utilizing a fracturing fluid that does not require crosslinkers or oxidizing breakers.

In the following detailed description of several illustrative examples, reference is made to the accompanying drawings that form a part hereof, and in which is shown by way of illustration, examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

As used herein, the term "formation" encompasses the term "reservoir," referring to a portion of the formation which has sufficient porosity and permeability to store or transmit fluids (e.g., hydrocarbons). As used herein, the term "fracturing fluid" refers generally to any fluid that may be used in a subterranean application in conjunction with a desired function and/or for a desired purpose. The term "fracturing fluid" does not imply any particular action by the fluid or any component thereof.

The examples described herein relate to the use of fracturing fluids for wellbore operations. The fracturing fluids may be introduced into a wellbore penetrating a subterranean formation. The fracturing fluids may be used to create or enhance a fracture in the subterranean formation. The fracturing fluids generally comprise a polymer having a hydrophilic monomer and a hydrophobic monomer. Advantageously, the polymer self-assembles into micelle-like structures with the hydrophobic chains disposed inside of spheres formed of the hydrophilic fragments. The hydrophobic chains are incorporated into the polymer via ester linkages. The ester linkages are stable at a pH between 6-7, but become increasingly unstable at higher pH and higher temperatures. A further advantage is that the self-assembly of the hydrophobic chains is similar to the formation of micelles, and this structure formation enhances the proppant suspension capabilities of the fracturing fluid without the need for crosslinkers. An additional advantage is that the polymer may be broken without the use of oxidative breakers, for example, the ester linkages may hydrolyze on their own over a sufficient period of time while in contact with an alkaline or an acidic fluid or formation fluid (e.g., a brine). Alternatively, an acid or a base may be added to facilitate hydrolysis. A further advantage is that in some examples, the fracturing fluid may consist essentially of the polymer, proppant, and base fluid. In other examples, the fracturing fluid may consist essentially of the polymer, proppant, aqueous base fluid, and a latent acid or base-generating component. As such, the overall composition of the fracturing fluid is simplified, making its preparation and management easier than other fracturing fluids. Further, the breaking of the ester linkages is a much less involved and easier to manage process than the use of oxidative breakers to break down the polymer backbone. Improving the suspension capabilities of the fracturing fluid involves simply increasing the polymer loading. Moreover, the polymer is stable at high temperatures for a sufficient amount of time to transport and place the proppant in the fractures. For example, the polymer may be stable for at least ten hours at a temperature of 250° F.

The fracturing fluid comprises a polymer. The polymer is hydrophobically-modified and comprises a hydrophobic monomer and a hydrophilic monomer. The hydrophobic monomer may include, but is not limited to, n-hexyl (meth) acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth) acrylate, cetyl (meth)acrylamide, oleyl (meth)acrylate, oleyl (meth)acrylamide, erucyl (meth)acrylate, erucyl (meth)acrylamide, and any combinations of hydrophobic monomers. The hydrophilic monomer may include, but is not limited to, acrylic acid, acrylate salts, acrylamide, 2-acrylamido-2-methylpropane sulfonic acid, 2-acrylamido-2-methylpropane sulfonic acid salts, and any combinations of hydrophilic monomers.

In some examples, the polymer includes the hydrophilic monomer in a total amount from about 50 wt % to about 99.9 wt % of the polymer. In some further examples, the polymer includes the hydrophilic monomer in a total amount from about 80 wt % to about 99.9 wt % of the polymer. In some examples, the polymer includes the hydrophobic monomer in a total amount from about 0.01 wt % to about 50 wt % of the polymer. In some further examples, the polymer includes the hydrophobic monomer in a total amount from about 0.01 wt % to about 20 wt % of the polymer.

In some examples, a terminal end position of the polymer includes a thiocarbonylthio functional group.

In some examples, the polymer may be provided in a powder form having a particle size of from about 5 µm to about 400 µm. In some further examples, the particle size may range from about 50 µm to about 200 µm. In alternative examples, the polymer may be provided in a slurry, including a solvent or hydrocarbon phase, and a suspension aiding agent, wherein the particle size of the polymer powder in the slurry ranges from about 5 µm to about 400 µm. In some examples, the molecular weight of the polymer may range from about 10,000 g/mol to about 20,000,000 g/mol.

The polymer chain is soluble overall in the aqueous base fluid and is predominantly formed of a series of hydrophilic units interrupted at different points by a plurality of hydrophobic sequences. The polymer of the present disclosure can be composed of the chain or else can be a block copolymer where the chain constitutes one of the blocks. The hydrophobic sequences are preferably polymer sequences which are insoluble in the base fluid, typically having a solubility at 20° C. of less than or equal to 0.1% (1,000 ppm) in the base fluid.

The polymer forms an entangled structure with the hydrophilic groups staying in the aqueous phase and the hydrophobic pendant chains distributed within and associating with each other. The hydrophobic pendant chains are incorporated into the polymer via ester linkages. This ester linkage is stable even at elevated temperatures and able to allow the fracturing fluid to suspend and transport proppant to the fracture. The ester linkage is very stable at a pH of 6-7. At higher pH and especially at higher temperatures, the ester linkage may hydrolyze and break the association of the hydrophobic pendant chains and the polymer backbone. This process does not oxidize the polymer backbone, which remains intact. When the ester linkage is broken, the viscosity of the fracturing fluid comprising the polymer decreases significantly and the fluid may be flowed back to the surface. The hydrolysis of the ester linkage is illustrated in the reaction below.

The length of the carbon chain of the hydrophobic pendant chain may be adjusted as desired to adjust the properties of the ester linkage. The hydrophobic pendant chain may further comprise a side chain to add additional functionality in some examples. The hydrophobic pendant chain may be branched or linear.

The concentration of the polymer in the fracturing fluid may range from about 10 pptg to about 80 pptg, where "pptg" is pounds per one thousand gallons. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polymer in the fracturing fluid may range from about 10 pptg to about 80 pptg, from about 15 pptg to about 80 pptg, from about 20 pptg to about 80 pptg, from about 25 pptg to about 80 pptg, from about 30 pptg to about 80 pptg, from about 35 pptg to about 80 pptg, from about 40 pptg to about 80 pptg, from about 45 pptg to about 80 pptg, from about 50 pptg to about 80 pptg, from about 55 pptg to about 80 pptg, from about 60 pptg to about 80 pptg, from about 65 pptg to about 80 pptg, from about 70 pptg to about 80 pptg, or from about 75 pptg to about 80 pptg. As another example, the concentration of the polymer in the fracturing fluid may range from about 10 pptg to about 80 pptg, from about 10 pptg to about 75 pptg, from about 10 pptg to about 70 pptg, from about 10 pptg to about 65 pptg, from about 10 pptg to about 60 pptg, from about 10 pptg to about 55 pptg, from about 10 pptg to about 50 pptg, from about 10 pptg to about 45 pptg, from about 10 pptg to about 40 pptg, from about 10 pptg to about 35 pptg, from about 10 pptg to about 30 pptg, from about 10 pptg to about 25 pptg, from about 10 pptg to about 20 pptg, or from about 10 pptg to about 15 pptg. With the benefit of this disclosure, one of ordinary skill in the art will be readily able to prepare a fracturing fluid having a sufficient concentration of the polymer for a given application.

The fracturing fluids described herein comprise an aqueous base fluid, for example, freshwater (salinity <0.5%), brackish water (salinity 0.05-3%), saline water (salinity 3-5%, e.g., water containing one or more salts, dissolved therein, or seawater), and brine (salinity >0.5%, up to 50%, e.g., saturated saltwater, including saturated saltwater produced from subterranean formations), or any combination thereof. In the case of brines, the aqueous base fluid may comprise a monovalent brine, a divalent brine, or a trivalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous base fluid for a chosen application.

In some examples, the polymer may be broken over time through dilution with a brine such as one used for the aqueous base fluid or through contact with formation waters. The time necessary to complete the breaking may be dependent on the concentration of the polymer, the pH of the fracturing fluid, the temperature of the area in which the fracturing fluid is disposed, and other factors. The concentration of the polymer and the pH of the fracturing fluid may be adjusted to increase or decrease the time necessary to break the polymer. In alternative examples, a non-oxidative breaker may be added to facilitate hydrolysis of the ester linkages and decrease the time required for breaking the polymer. The non-oxidative breaker may be an acid or a base. The non-oxidative breaker may be delayed or non-delayed. Examples of non-delayed, non-oxidative breakers include, but are not limited to, sodium hydroxide, potassium hydroxide, lithium hydroxide, cesium hydroxide, hydrochloric acid, hydrobromic acid, chloric acid, bromic acid, sulfurous acid, sulfuric acid, phosphorous acid, phosphoric acid, formic acid, acetic acid, propionic acid, acrylic acid, butyric acid, sec-butyric acid, methacrylic acid, crotonic acid, pentanonic acid, lactic acid, benzoic acid, salicylic acid, oxalic acid, malonic acid, succinic acid, maleic acid, fumaric acid, citric acid, phthalic acid, or any combination of non-oxidative breakers. A delayed non-oxidative breaker is one that must undergo an intermediate reaction before forming the acid or base. Examples of delayed, non-oxidative breakers include, but are not limited to, magnesium oxide/hydroxide, calcium oxide/hydroxide, polylactic acid, polyglycolic acid, sodium formate, sodium acetate, sodium propionate, sodium acrylate, sodium butyrate, sodium sec-butyrate, sodium crotonate, sodium methacrylate, sodium pentanoate, sodium lactate, sodium benzoate, mono-, or disodium oxalate, mono-, or disodium malonate, mono-, or disodium succinate, mono-, or disodium maleate, mono-, or disodium fumarate, mono-, or disodium phthalate, mono-, di-, or (tri)sodium phosphate, sodium bicarbonate, sodium carbonate, sodium bisulfide, sodium sulfide, sodium bisulfite, sodium sulfite, sodium hypochlorite, sodium chlorite, sodium fluoride, sodium silicate, sodium borate, borax, mono-, di-, or (tri)sodium citrate, mono-, di-, tri-, or tetra-sodium EDTA, sodium phenoxide, sodium salicylate, potassium formate, potassium acetate, potassium propionate, potassium acrylate, potassium butyrate, potassium sec-butyrate, potassium crotonate, potassium methacrylate, potassium pentanoate, potassium lactate, potassium benzoate, mono-, or dipotassium oxalate, mono-, or dipotassium malonate, mono-, or dipotassium succinate, mono-, or dipotassium maleate, mono-, or dipotassium fumarate, mono-, or dipotassium phthalate, mono-, di-, or (tri)potassium phosphate, potassium bicarbonate, potassium carbonate, potassium bisulfide, potassium sulfide, potassium bisulfite, potassium sulfite, potassium hypochlorite, potassium chlorite, potassium fluoride, potassium silicate, potassium borate, mono-, di-, or (tri)potassium citrate, mono-, di-, tri-, tetrapotassium EDTA, potassium phenoxide, potassium salicylate, calcium formate, calcium acetate, calcium propionate, calcium acrylate, calcium butyrate, calcium sec-butyrate, calcium crotonate, calcium methacrylate, calcium pentanoate, calcium lactate, calcium benzoate, calcium hydrooxalate, calcium oxalate, calcium hydromalonate, calcium malonate, calcium hydrosuccinate, calcium succinate, calcium hydromaleate, calcium maleate, calcium hydrofumarate, calcium fumarate, calcium dihydrogencitrate, calcium hydrophthalate, calcium phthalate, calcium hydrogencitrate, calcium dihydrogenphosphate, calcium hydrogenphosphate, calcium bicarbonate, calcium bisulfide, calcium bisulfite, calcium hypochlorite, calcium chlorite, calcium borate, Ulexite, Colemanite, calcium phenoxide, calcium salicylate, magnesium formate, magnesium acetate, magnesium propionate, magnesium acrylate, magnesium butyrate, magnesium sec-butyrate, magnesium crotonate, magenesium methacrylate, magnesium pentanoate, magnesium lactate, magenesium benzoate, magesium hydrooxalate, magnesium oxalate, calcium hydromalonate, magnesium malonate, magnesium hydrosuccinate, magnesium succinate, magnesium hydromaleate, magnesium maleate, magnesium hydrofumarate, magnesium fumarate, magnesium hydrophthalate, magnesium phthalate, magnesium bicarbonate, magnesium bisulfide, magnesium bisulfite, magnesium sulfite, magnesium hypochlorite, magnesium chlorite, magnesium borate, magnesium dihydrogencitrate, magnesium hydrogencitrate, magnesium citrate, magnesium phenoxide, magnesium salicylate, oxalic anhydride, malonic anhydride, succinic anhydride, maleic anhydride, phthalic anhydride, or any combination of non-oxidative breakers. One of ordinary skill in the art, with the benefit of this disclosure, should be readily able to select a non-oxidative breaker for a chosen application. In some embodiments, the fracturing fluid may be substantially free of an oxidative breaker.

The fracturing fluid may break at a desired time. The term "break" as used herein refers to the transition of the fracturing fluid from a viscosity in which the proppant remains suspended or stable, to a viscosity in which the proppant settles out of the fracturing fluid. The "breaking time" is the duration of time in which this transition is made from the first stable viscosity to the second settling viscosity. For example, the fracturing fluid may break after a time of about 1 hour, 2 hours, 3 hours, 4 hours, 5 hours, 6 hours, 7 hours, 8, hours, 9 hours, 10 hours, or longer. In some examples, the fracturing fluid is stable at a viscosity of about 100 cP. In some examples, the fracturing fluid is unstable (i.e., the proppant begins to settle) when the fracturing fluid is at a viscosity of 50 cP. For this specific example, the breaking time is the time required for the fracturing fluid to transition from a viscosity of 70 cP to a viscosity of 30 cP at a shear rate of 100 $s^{-1}$ and at 70° F. In another example, the breaking time is the time required for the fracturing fluid to transition from 70 cP or greater to a viscosity of 30 cP or less at a shear rate of 100 $s^{-1}$ at 70° F. The breaking time is a function of a variety of factors including the polymer loading, the type and size of the proppant selected, the temperature of the subterranean formation, the pH of the fracturing fluid, etc.

Due to the unique properties of the polymer, the suspension capabilities of the polymer are in part due to the higher storage modulus of the polymer. As such, the fracturing fluid is capable of sufficient proppant suspension at lower viscosities than those observed in traditional crosslinked fluids which may have viscosities of a 1000 cP or more at room temperature when they are fully crosslinked.

The fracturing fluids comprise a proppant. The proppant may be any material used to prop the fracture preventing its closure. Examples of proppant include, but are not limited to, high-quality sand; particulate garnet; metal particulates; ceramic proppants; aluminum oxide; bauxite; bauxitic clay; kaolin; alumino-silicates; iron oxide, and other ores or minerals; cement; cement composites; ceramics; polymer composites containing particulate materials, such as nanoparticles; porous ceramics; porous organic materials; porous metals; low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof; and any combination thereof. The proppant may be any shape (e.g., the proppant may be substantially or partially spherical in shape, substantially or partially round in shape, cylindrical, fibrous, polygonal shaped (such as cubic), irregularly shaped, and any combination thereof). The proppant may be any size. One of ordinary skill in the art, with the benefit of this disclosure, should be readily able to select a proppant for a chosen application.

In some examples, the fracturing fluid may consist essentiality of the polymer, the aqueous base fluid, and the proppant. In other examples, the fracturing fluid may consist essentially of the polymer, the aqueous base fluid, the proppant, and a non-oxidative breaker, which may be delayed or non-delayed.

In one example fracturing method, an acid or base may be introduced into the fracture in a first fracturing fluid that does not comprise the polymer. The first fracturing fluid may comprise an aqueous base fluid such as a brine and/or an acid or base such as sodium hydroxide. The first fracturing fluid may be a pad fluid used to create or enhance a fracture. After introduction of the first fracturing fluid, a second fracturing fluid comprising the polymer may be introduced. The second fracturing fluid may comprise the polymer and a delayed or non-delayed non-oxidative breaker, or may comprise the polymer with no breaker. The first fracturing fluid may or may not comprise proppant. The second fracturing fluid comprises proppant. Subsequent fracturing fluids may also be introduced in some examples having any composition.

In another example fracturing method, the first fracturing fluid is pad fluid used to create or enhance a fracture. The first fracturing fluid does not comprise an acid or a base and also does not comprise the polymer. The first fracturing fluid may comprise an aqueous base fluid such as a brine. In some examples, the first fracturing fluid does not comprise a brine. After introduction of the first fracturing fluid, a second fracturing fluid comprising a polymer is introduced. The second fracturing fluid may comprise the polymer and a delayed or non-delayed non-oxidative breaker, or may comprise the polymer with no breaker. The first fracturing fluid may or may not comprise proppant. The second fracturing fluid comprises proppant. Subsequent fracturing fluids may also be introduced in some examples having any composition.

In some optional examples, the fracturing fluid may comprise an additive. The additive may be used to adjust a property of the fracturing fluid (e.g., viscosity, density, etc.)

Examples of the additives include, but are not limited to, corrosion inhibitors, surfactants, gel stabilizers, anti-oxidants, polymer degradation prevention additives, relative permeability modifiers, scale inhibitors, foaming agents, defoaming agents, antifoaming agents, iron control agents, particulate diverters, salts, fluid loss control additives, gas, catalysts, clay control agents, dispersants, flocculants, scavengers (e.g., $H_2S$ scavengers, or $O_2$ scavengers), lubricants, friction reducers, bridging agents, weighting agents, solubilizers, paraffin/asphaltenes inhibitors, emulsion breaker, hydrate inhibitors, consolidating agents, bactericides, clay stabilizers, breakers, delayed release breakers, the like, or any combination thereof. With the benefit of this disclosure, one of ordinary skill in the art will be able to formulate a fracturing fluid having properties suitable for a desired application.

The present disclosure provides fracturing fluids, methods, and systems for treating a subterranean formation. The fracturing fluids comprise a polymer, an aqueous base fluid, and a proppant. The methods may include preparing a fracturing fluid comprising the polymer. The methods may include pumping the fracturing fluid in a wellbore penetrating a subterranean formation. The methods may also include introducing the fracturing fluid into a portion of the subterranean formation from the wellbore. The systems may include pumping and mixing equipment to convey the fracturing fluid to the interval of the wellbore comprising the target subterranean formation.

Example systems may comprise a pump fluidly coupled to a tubular, the tubular containing a fracturing fluid as described herein. The pump may be a high-pressure pump. As used herein, the term "high-pressure pump" will refer to a pump that is capable of delivering a fluid downhole at a pressure of about 1000 psi or greater. A high-pressure pump may be used when it is desired to introduce the fracturing fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps may include, but are not limited to, floating piston pumps and positive displacement pumps. In other examples, the pump may be a low-pressure pump. As used herein, the term "low-pressure pump" will refer to a pump that operates at a pressure of about 1000 psi or less. In some examples, a low-pressure pump may be fluidly coupled to a high-pressure pump that is fluidly coupled to the tubular. That is, the low-pressure pump may be configured to convey the fracturing fluid to the high-pressure pump. In such examples, the low-pressure pump may "step up" the pressure of the fracturing fluid before it reaches the high-pressure pump. In any example, a high-pressure pump and/or a low-pressure pump may convey the fracturing fluid to the location of a target subterranean formation. The pumps may supply sufficient pressure to allow the fracturing fluid to fracture the subterranean formation. That is, the pumps may meet or exceed the fracture gradient of the subterranean formation.

In some examples, the systems described herein may further comprise a mixing tank that is upstream of the pump and is the vessel in which the fracturing fluid is formulated. In various examples, the pump (e.g., a low-pressure pump, a high-pressure pump, or a combination thereof) may convey the fracturing fluid from the mixing tank to the transporting conduit. In other examples, the fracturing fluid may be formulated offsite and transported to a worksite, in which case the fracturing fluid may be introduced to the transporting conduit via the pump either directly from its shipping container (e.g., a truck, a railcar, a barge, or the like) or from a transport pipeline. In either case, the fracturing fluid may be drawn into the pump, elevated to an appropriate pressure, and then introduced into the transporting conduit for delivery downhole.

When desired for use, the polymer may be added to the aqueous base fluid containing the proppant and mixed as desired. In alternative examples, the polymer may be added to the aqueous base fluid followed by the proppant or other fracturing fluid additive(s) and then mixed as desired. In some examples, the polymer may be hydrated before it is introduced to the aqueous base fluid. The components and additives of the fracturing fluid may be added or introduced to one another in any order and at any time during the use of the fracturing fluid.

Figure 1:
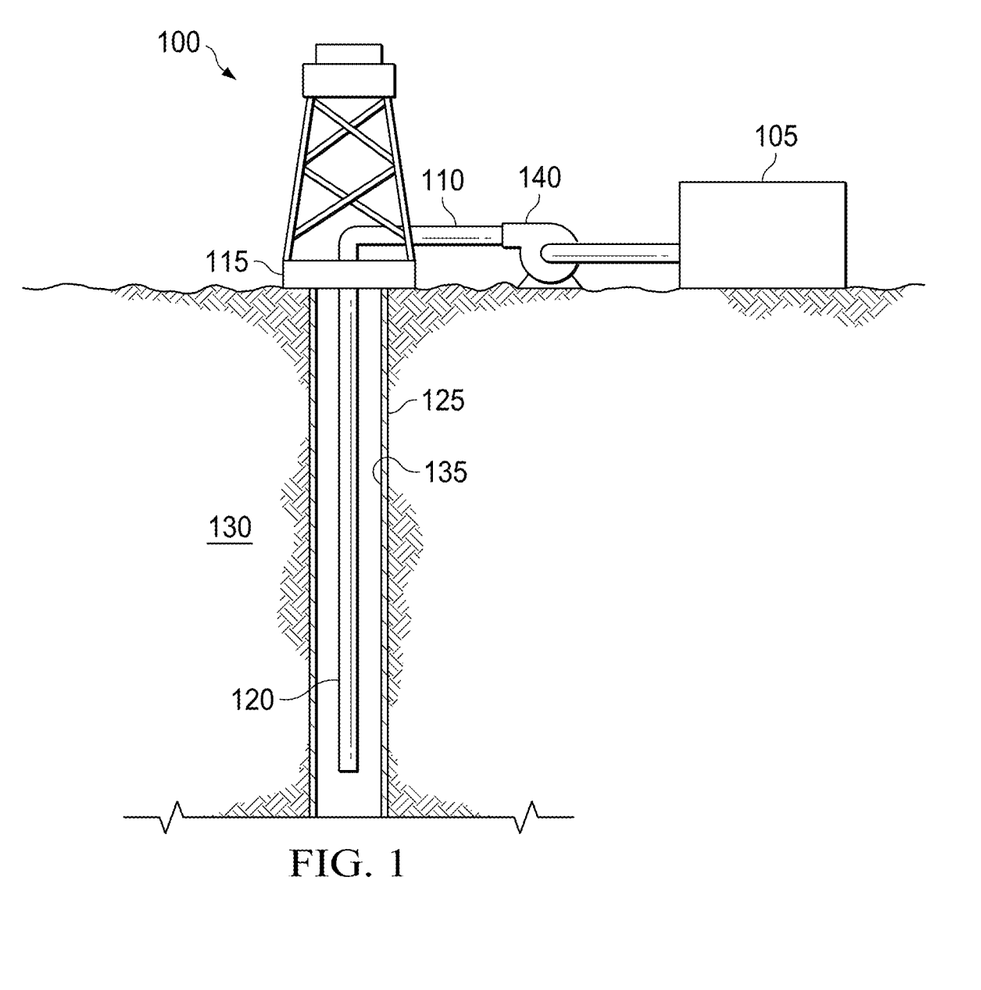
FIG. 1 is a schematic illustrating a system of surface equipment for the preparation and delivery of a fracturing fluid to a wellbore in accordance with one or more examples described herein.

FIG. 1 illustrates a schematic of the surface and near-surface portions of a system that can deliver the fracturing fluids described herein to a downhole location, according to one or more examples. It should be noted that while FIG. 1 generally depicts a land-based system, it is to be recognized that like systems may be operated in subsea locations as well. As depicted in FIG. 1, system 100 may include mixing tank 105, in which a fracturing fluid comprising the polymer may be formulated. The fracturing fluid may be conveyed via line 110 to wellhead 115, where the fracturing fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the fracturing fluid may subsequently enter into subterranean formation 130 as described in FIG. 2 below. Pump 140 may be configured to raise the pressure of the fracturing fluid to a desired degree before its introduction into tubular 120.

Although not depicted in FIG. 1, the fracturing fluid may, in some examples, flow back to wellhead 115 and exit subterranean formation 130. In some optional examples, the fracturing fluid that has flowed back to wellhead 115 may subsequently be recovered and recirculated to subterranean formation 130.

Figure 2:
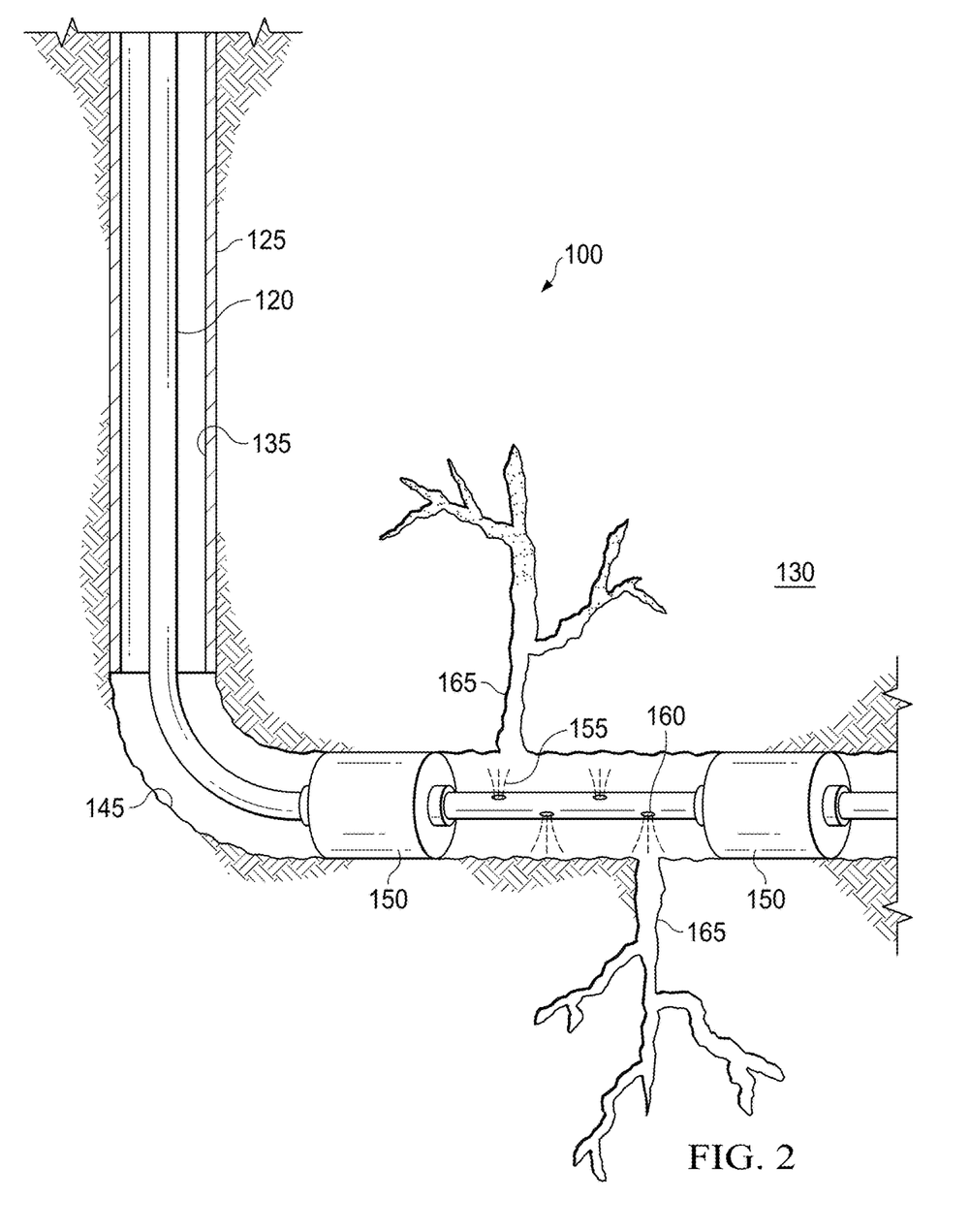
FIG. 2 is a schematic illustrating the placement of a fracturing fluid into a fracture in a subterranean formation in accordance with one or more examples described herein.

FIG. 2 illustrates a schematic of the downhole portion of the system 100 illustrated in FIG. 1, according to one or more examples. As depicted in FIG. 2, tubular 120 extends from the wellhead 115 (as illustrated in FIG. 1) into wellbore 125 penetrating subterranean formation 130. After descending through the heel 145 of the wellbore 125, tubular 120 may be coupled to one or more packers 150 positioned to isolate an interval of wellbore 125. A fracturing fluid 155, as described herein, may exit tubular 120 through openings 160. The fracturing fluid 155 may be introduced into the subterranean formation 130 via a primary fracture 165 of other such opening into the subterranean formation 130. The fracturing fluid 155 may create or enhance the primary fracture 165. In some optional examples, fracturing fluid 155 is a second fracturing fluid, and a first fracturing fluid is introduced prior. The first fracturing fluid may comprise a brine and/or an acid or base such as sodium hydroxide.

It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

It is also to be recognized that the disclosed fracturing fluids may also directly or indirectly affect the various downhole equipment and tools that may contact the fracturing fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-2.

EXAMPLES

The present disclosure may be better understood by reference to the following examples, which are offered by way of illustration. The present disclosure is not limited to the examples provided herein.

Example 1

Figure 3:
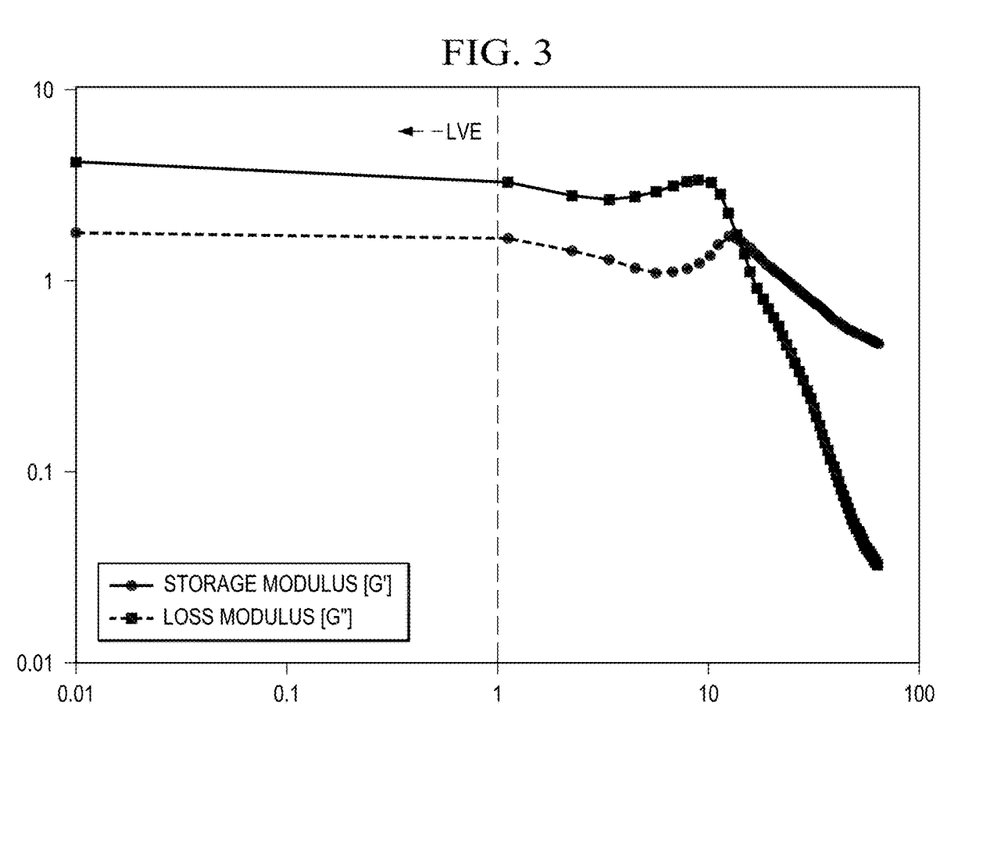
FIG. 3 is a graph illustrating an oscillatory sweep of an example fracturing fluid in accordance with one or more examples described herein.

An oscillatory sweep was performed charting the storage modulus and the loss modulus of a 40 pptg loading of the hydrophobically-modified polymer. The oscillatory sweep is illustrated by FIG. 3. This graph illustrates the higher storage modulus of a fracturing fluid with the hydrophobically-modified polymer as well as some of the viscoelastic properties of the fracturing fluid.

Example 2

Figure 4:
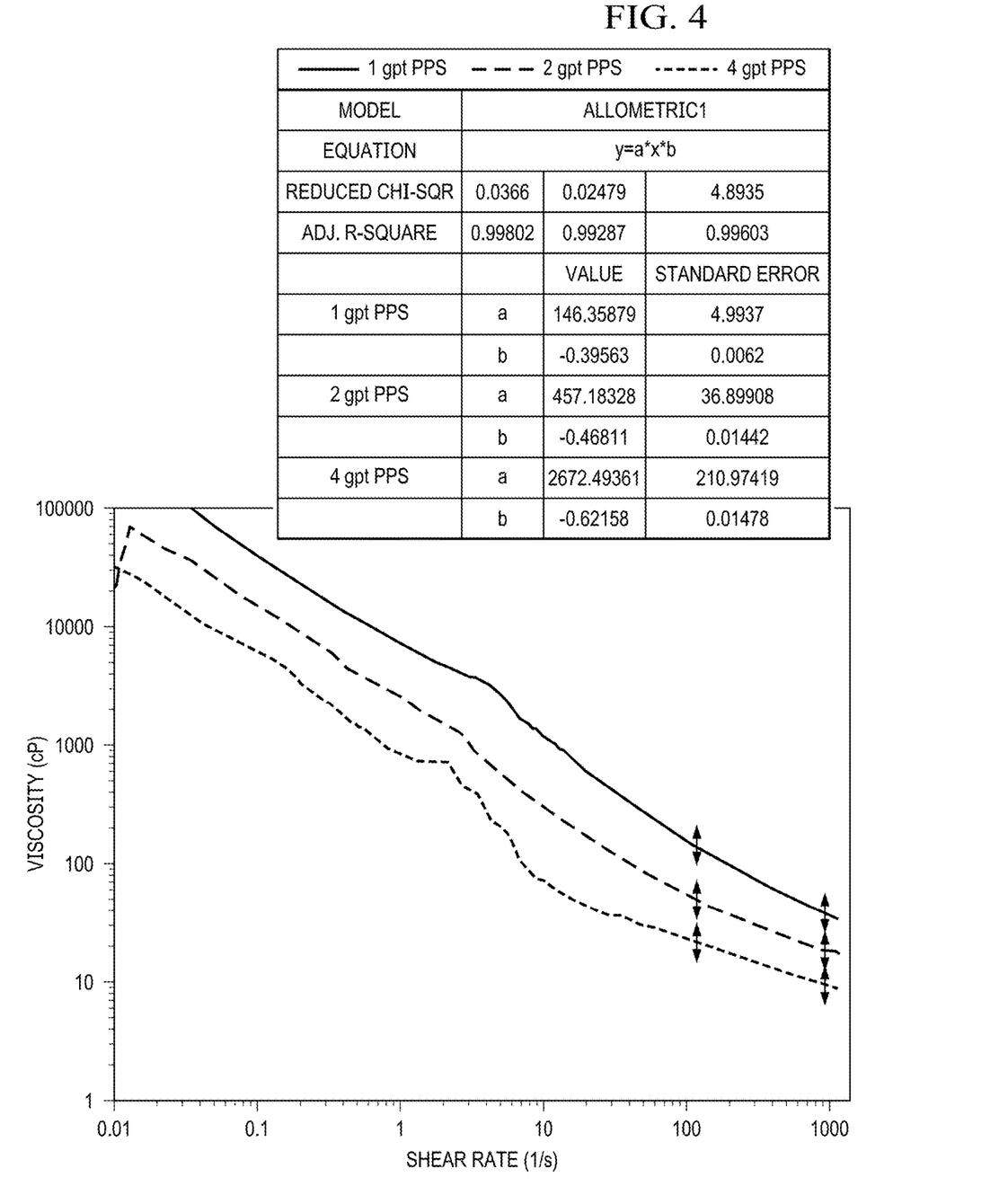
FIG. 4 is a graph charting the viscosity of three example fracturing fluids over increasing shear rate in accordance with one or more examples described herein.

FIG. 4 is a graph charting the change in viscosity over increasing shear rate for three different loadings of the hydrophobically-modified polymer at room temperature. As observed, the viscosity may be increased simply by increasing the polymer loading without the need for additional additives or crosslinkers.

Example 3

Figure 5:
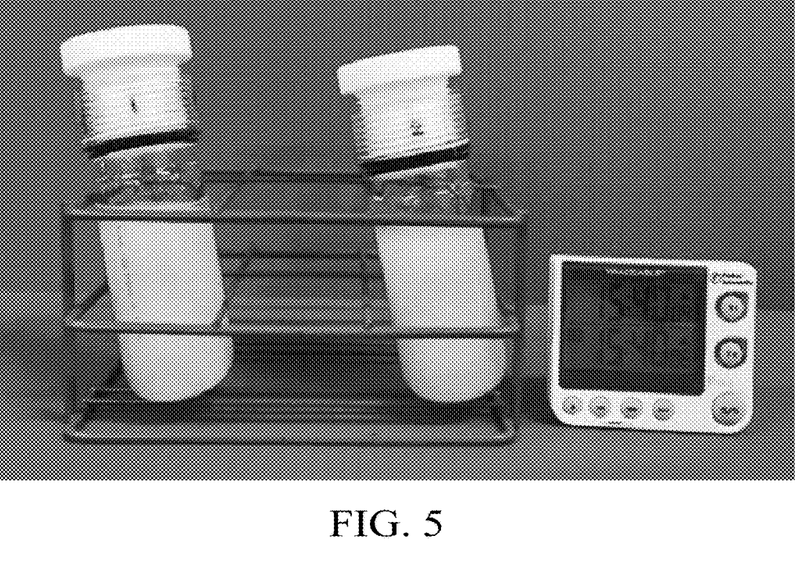
FIG. 5 is a photograph demonstrating the proppant suspension capabilities of an example fracturing fluid in accordance with one or more examples described herein.

FIG. 5 is a photograph demonstrating that the proppant remains suspended for over 15 hours at 250° F. with an example fracturing fluid having a hydrophobically-modified polymer loading of 40 pptg.

Example 4

Figure 6:
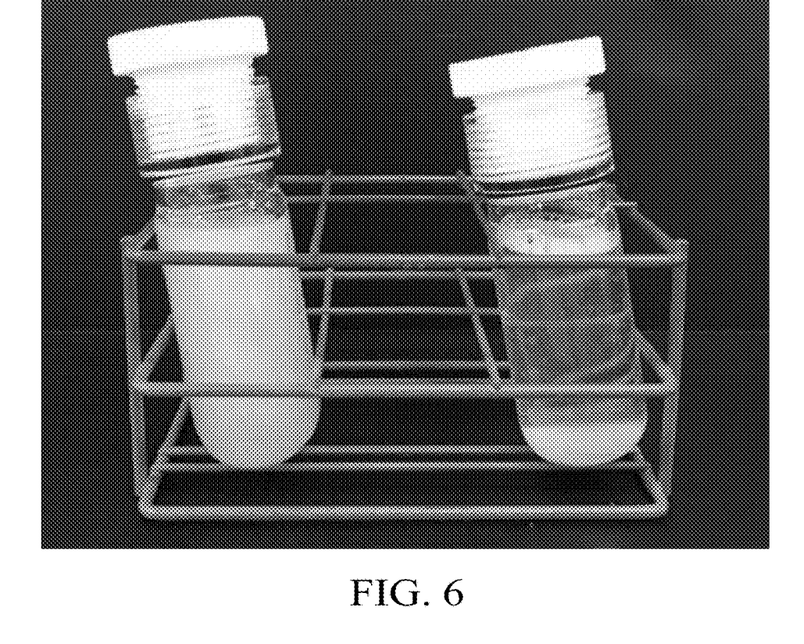
FIG. 6 is a photograph demonstrating the breaking of an example fracturing fluid with a simple brine solution in accordance with one or more examples described herein.

FIG. 6 is a photograph demonstrating that the fluid can be broken after 6 hours by the addition of a 10% NaCl solution. The control sample is on the left and remains stable after 6 hours. The hydrophobically-modified polymer loading for both the control and the experimental sample was 30 pptg. The temperature was 200° F.

Example 5

Figure 7:
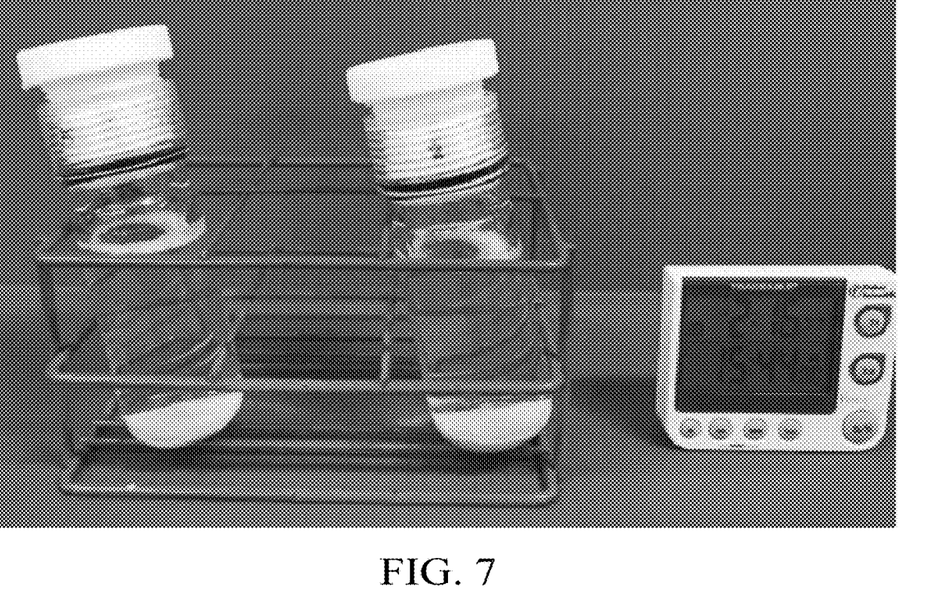
FIG. 7 is a photograph demonstrating the breaking of an example fracturing fluid with a caustic in accordance with one or more examples described herein.

FIG. 7 is a photograph demonstrating that the fluid can be broken after 2 hours by the addition of a 2% (v/v) of a caustic solution. The hydrophobically-modified polymer loading was 40 pptg. The temperature was 250° F. Increasing the amount of caustic and/or increasing the temperature will increase the speed of the breaking operation.

Example 6

Figure 8A:
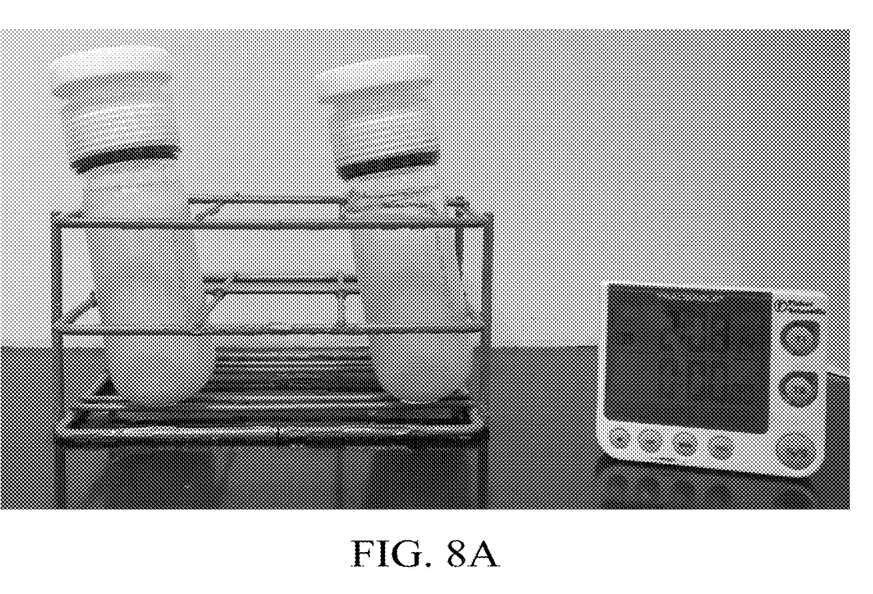
FIG. 8A is a photograph demonstrating the breaking of an example fracturing fluid with an acid after two hours in accordance with one or more examples described herein.
Figure 8B:
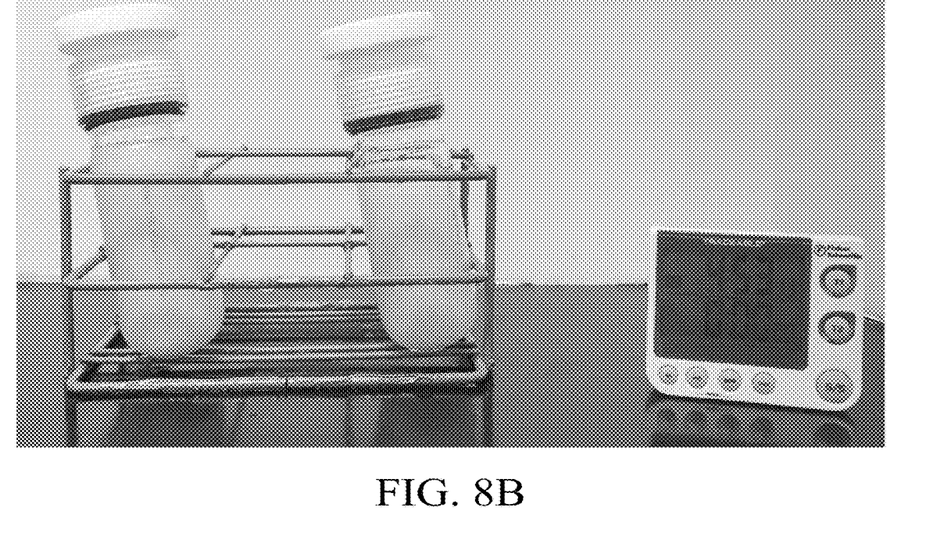
FIG. 8B is a photograph demonstrating the breaking of an example fracturing fluid with an acid after five hours in accordance with one or more examples described herein.
Figure 8C:
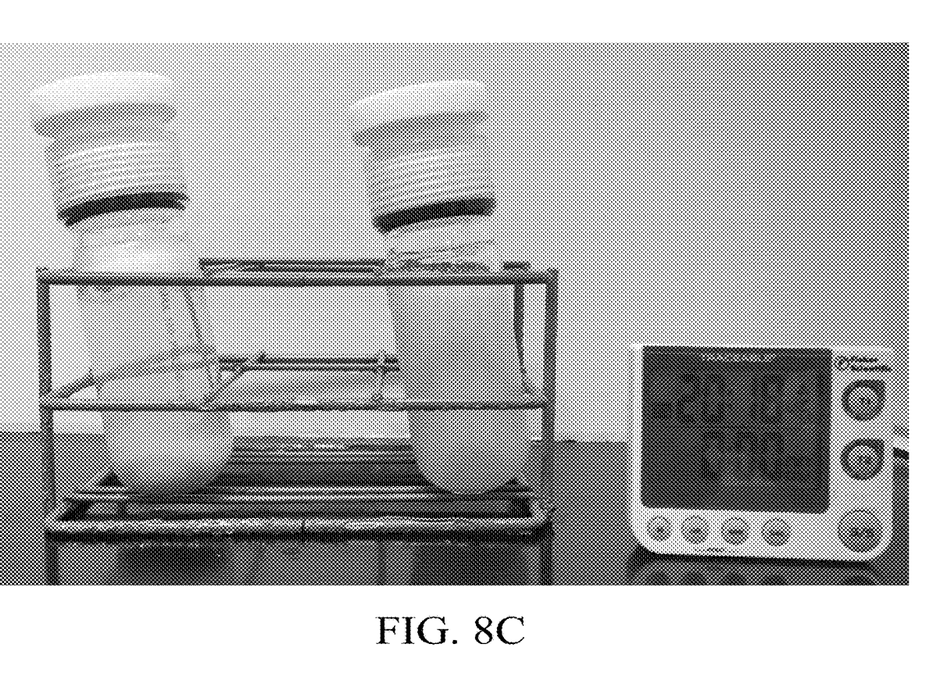
FIG. 8C is a photograph demonstrating the breaking of an example fracturing fluid with an acid after twenty hours in accordance with one or more examples described herein.

FIGS. 8A-8C illustrates a comparison example of the breaking of the fluid with an acid. FIG. 8A illustrates the breaking progression after two hours. FIG. 8B illustrates the breaking progression after five hours. FIG. 8C illustrates the breaking progression after twenty hours. In all of the photographs, the fluid in the tube on the right was prepared with 20 pptg polymer in 200 mL water in the presence of 0.2 mL of a clay stabilization agent. The fluid in the tube on the left was prepared with 20 pptg polymer in 200 mL water in the presence of 0.2 mL of a clay stabilization agent and 0.4 mL of an aqueous acid. To this sample, 24 g (1 ppga) of 100 mesh sand was mixed in after polymer hydration. The samples were left in a 200° F. water bath. This example shows that the addition of this acid solution can provide fluid with at least 5 hours stability and can be broken within 20 hours.

Provided are methods of treating a subterranean formation in accordance with the disclosure. An example method comprises introducing a pad fluid into a wellbore penetrating the subterranean formation to create or enhance one or more fractures in the subterranean formation, the pad fluid comprising a first aqueous base fluid. The method further comprises introducing a fracturing fluid into the fracture, the fracturing fluid comprising: a polymer comprising a hydrophobic monomer and a hydrophilic monomer; wherein the hydrophobic monomer comprises a monomer selected from the group consisting of n-hexyl (meth)acrylate, n-octyl (meth)acrylate, octyl (meth)acrylamide, lauryl (meth)acrylate, lauryl (meth)acryl amide, myristyl (meth)acrylate, myristyl (meth)acryl amide, pentadecyl (meth)acrylate, pentadecyl (meth)acrylamide, cetyl (meth)acrylate, cetyl (meth) acrylamide, oleyl (meth)acrylate, oleyl (meth)acrylamide, erucyl (meth)acrylate, erucyl (meth)acrylamide, and any combinations thereof; wherein the hydrophilic monomer comprises a monomer selected from the group consisting of acrylate, acrylate salts, acrylamide, 2-acrylamido-2-methylpropane sulfonic acid, 2-acrylamido-2-methylpropane sulfonic acid salts, and any combinations thereof. The fracturing fluid further comprises a proppant; and a second aqueous base fluid. The fracturing fluid does not comprise a crosslinker or an oxidative breaker. The method further comprises allowing or causing to allow the fracturing fluid to break thereby settling the proppant in the fracture.

Additionally or alternatively, the method may include one or more of the following features individually or in combination. The pad fluid may comprise a brine. The pad fluid may comprise a caustic or acid selected from the group consisting of sodium hydroxide, potassium hydroxide, lithium hydroxide, cesium hydroxide, hydrochloric acid, hydrobromic acid, chloric acid, bromic acid, sulfurous acid, sulfuric acid, phosphorous acid, phosphoric acid, formic acid, acetic acid, propionic acid, acrylic acid, butyric acid, sec-butyric acid, methacrylic acid, crotonic acid, pentanonic acid, lactic acid, oxalic acid, malonic acid, succinic acid, maleic acid, benzoic acid, salicylic acid, phthalic acid, methanesulfonic acid, and any combinations thereof. The fracturing fluid may comprise a non-oxidative breaker selected from the group consisting of magnesium oxide, magnesium oxide/hydroxide, calcium oxide/hydroxide, polylactic acid, polyglycolic acid, sodium formate, sodium acetate, sodium propionate, sodium acrylate, sodium butyrate, sodium sec-butyrate, sodium crotonate, sodium methacrylate, sodium pentanoate, sodium lactate, sodium benzoate, mono-, or disodium oxalate, mono-, or disodium malonate, mono-, or disodium succinate, mono-, or disodium maleate, mono-, or disodium fumarate, mono-, or disodium phthalate, mono-, di-, or (tri)sodium phosphate, sodium bicarbonate, sodium carbonate, sodium bisulfide, sodium sulfide, sodium bisulfite, sodium sulfite, sodium hypochlorite, sodium chlorite, sodium fluoride, sodium silicate, sodium borate, borax, mono-, di-, or (tri)sodium citrate, mono-, di-, tri-, or tetrasodium EDTA, sodium phenoxide, sodium salicylate, potassium formate, potassium acetate, potassium propionate, potassium acrylate, potassium butyrate, potassium sec-butyrate, potassium crotonate, potassium methacrylate, potassium pentanoate, potassium lactate, potassium benzoate, mono-, or dipotassium oxalate, mono-, or dipotassium malonate, mono-, or dipotassium succinate, mono-, or dipotassium maleate, mono-, or dipotassium fumarate, mono-, or dipotassium phthalate, mono-, di-, or (tri)potassium phosphate, potassium bicarbonate, potassium carbonate, potassium bisulfide, potassium sulfide, potassium bisulfite, potassium sulfite, potassium hypochlorite, potassium chlorite, potassium fluoride, potassium silicate, potassium borate, mono-, di-, or (tri)potassium citrate, mono-, di-, tri-, tetrapotassium EDTA, potassium phenoxide, potassium salicylate, calcium formate, calcium acetate, calcium propionate, calcium acrylate, calcium butyrate, calcium sec-butyrate, calcium crotonate, calcium methacrylate, calcium pentanoate, calcium lactate, calcium benzoate, calcium hydrooxalate, calcium oxalate, calcium hydromalonate, calcium malonate, calcium hydrosuccinate, calcium succinate, calcium hydromaleate, calcium maleate, calcium hydrofumarate, calcium fumarate, calcium dihydrogencitrate, calcium hydrophthalate, calcium phthalate, calcium hydrogencitrate, calcium dihydrogenphosphate, calcium hydrogenphosphate, calcium bicarbonate, calcium bisulfide, calcium bisulfite, calcium hypochlorite, calcium chlorite, calcium borate, Ulexite, Colemanite, calcium phenoxide, calcium salicylate, magnesium formate, magnesium acetate, magnesium propionate, magnesium acrylate, magnesium butyrate, magnesium sec-butyrate, magnesium crotonate, magenesium methacrylate, magnesium pentanoate, magnesium lactate, magenesium benzoate, magesium hydrooxalate, magnesium oxalate, calcium hydromalonate, magnesium malonate, magnesium hydrosuccinate, magnesium succinate, magnesium hydromaleate, magnesium maleate, magnesium hydrofumarate, magnesium fumarate, magnesium hydrophthalate, magnesium phthalate, magnesium bicarbonate, magnesium bisulfide, magnesium bisulfite, magnesium sulfite, magnesium hypochlorite, magnesium chlorite, magnesium borate, magnesium dihydrogencitrate, magnesium hydrogencitrate, magnesium citrate, magnesium phenoxide, magnesium salicylate, oxalic anhydride, malonic anhydride, succinic anhydride, maleic anhydride, phthalic anhydride, or any combination of non-oxidative breakers, and any combinations thereof. The proppant may be suspended in the fracturing fluid when the fracturing fluid has a first viscosity; wherein the proppant settles out of the fracturing fluid when the fracturing fluid has a second viscosity; and wherein the allowing or causing to allow the fracturing fluid to break comprises transitioning from the first viscosity to the second viscosity in a time of less than 24 hours. The first viscosity may be a viscosity of 100 cP or greater and the second viscosity may be a viscosity of 30 cP or less at shear rate of 100 l/s at 70° F. The hydrophilic monomer may be present in the polymer in a total amount from about 50 wt % to about 99.9 wt % of the polymer; and wherein the hydrophobic monomer may be present in the polymer in a total amount from about 0.01 wt % to about 50 wt % of the polymer. The polymer may be present in the fracturing fluid in a concentration of about 10 pptg to about 80 pptg. The proppant may be selected from the group consisting of: high-quality sand; particulate garnet; metal particulates; ceramic proppants; aluminum oxide; bauxite; bauxitic clay; kaolin; alumino-silicates; iron oxide, and other ores or minerals; cement; cement composites; ceramics; polymer composites containing particulate materials, such as nanoparticles; porous ceramics; porous organic materials; porous metals; low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof; and any combinations thereof.

Provided are fracturing fluid compositions in accordance with the disclosure. An example fracturing fluid composition comprises a polymer comprising a hydrophobic monomer and a hydrophilic monomer; wherein the hydrophobic monomer comprises a monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acryl amide, cetyl (meth)acrylate, cetyl (meth)acryl amide, oleyl (meth)acrylate, oleyl (meth)acrylamide, erucyl (meth)acrylate, erucyl (meth)acrylamide, and any combinations thereof; wherein the hydrophilic monomer comprises a monomer selected from the group consisting of acrylate, acrylate salts, acrylamide, 2-acrylamido-2-methylpropane sulfonic acid, 2-acrylamido-2-methylpropane sulfonic acid salts, and any combinations thereof. The fracturing fluid further comprises a proppant and an aqueous base fluid. The fracturing fluid does not comprise a crosslinker or an oxidative breaker.

Additionally or alternatively, the fracturing fluid composition may include one or more of the following features individually or in combination. The fracturing fluid may comprise a caustic or acid selected from the group consisting of sodium hydroxide, potassium hydroxide, lithium hydroxide, cesium hydroxide, hydrochloric acid, hydrobromic acid, chloric acid, bromic acid, sulfurous acid, sulfuric acid, phosphorous acid, phosphoric acid, formic acid, acetic acid, propionic acid, acrylic acid, butyric acid, sec-butyric acid, methacrylic acid, pentanonic acid, lactic acid, oxalic acid, malonic acid, succinic acid, maleic acid, fumaric acid, benzoic acid, salicylic acid, phthalic acid, methanesulfonic acid, and any combinations thereof. The fracturing fluid may comprise a non-oxidative breaker selected from the group consisting of magnesium oxide, magnesium oxide/hydroxide, calcium oxide/hydroxide, polylactic acid, polyglycolic acid, sodium formate, sodium acetate, sodium propionate, sodium acrylate, sodium butyrate, sodium sec-butyrate, sodium crotonate, sodium methacrylate, sodium pentanoate, sodium lactate, sodium benzoate, mono-, or disodium oxalate, mono-, or disodium malonate, mono-, or disodium succinate, mono-, or disodium maleate, mono-, or disodium fumarate, mono-, or disodium phthalate, mono-, di-, or (tri)sodium phosphate, sodium bicarbonate, sodium carbonate, sodium bisulfide, sodium sulfide, sodium bisulfite, sodium sulfite, sodium hypochlorite, sodium chlorite, sodium fluoride, sodium silicate, sodium borate, borax, mono-, di-, or (tri)sodium citrate, mono-, di-, tri-, or tetrasodium EDTA, sodium phenoxide, sodium salicylate, potassium formate, potassium acetate, potassium propionate, potassium acrylate, potassium butyrate, potassium sec-butyrate, potassium crotonate, potassium methacrylate, potassium pentanoate, potassium lactate, potassium benzoate, mono-, or dipotassium oxalate, mono-, or dipotassium malonate, mono-, or dipotassium succinate, mono-, or dipotassium maleate, mono-, or dipotassium fumarate, mono-, or dipotassium phthalate, mono-, di-, or (tri)potassium phosphate, potassium bicarbonate, potassium carbonate, potassium bisulfide, potassium sulfide, potassium bisulfite, potassium sulfite, potassium hypochlorite, potassium chlorite, potassium fluoride, potassium silicate, potassium borate, mono-, di-, or (tri)potassium citrate, mono-, di-, tri-, tetrapotassium EDTA, potassium phenoxide, potassium salicylate, calcium formate, calcium acetate, calcium propionate, calcium acrylate, calcium butyrate, calcium sec-butyrate, calcium crotonate, calcium methacrylate, calcium pentanoate, calcium lactate, calcium benzoate, calcium hydrooxalate, calcium oxalate, calcium hydromalonate, calcium malonate, calcium hydrosuccinate, calcium succinate, calcium hydromaleate, calcium maleate, calcium hydrofumarate, calcium fumarate, calcium dihydrogencitrate, calcium hydrophthalate, calcium phthalate, calcium hydrogencitrate, calcium dihydrogenphosphate, calcium hydrogenphosphate, calcium bicarbonate, calcium bisulfide, calcium bisulfite, calcium hypochlorite, calcium chlorite, calcium borate, Ulexite, Colemanite, calcium phenoxide, calcium salicylate, magnesium formate, magnesium acetate, magnesium propionate, magnesium acrylate, magnesium butyrate, magnesium sec-butyrate, magnesium crotonate, magenesium methacrylate, magnesium pentanoate, magnesium lactate, magenesium benzoate, magesium hydrooxalate, magnesium oxalate, calcium hydromalonate, magnesium malonate, magnesium hydrosuccinate, magnesium succinate, magnesium hydromaleate, magnesium maleate, magnesium hydrofumarate, magnesium fumarate, magnesium hydrophthalate, magnesium phthalate, magnesium bicarbonate, magnesium bisulfide, magnesium bisulfite, magnesium sulfite, magnesium hypochlorite, magnesium chlorite, magnesium borate, magnesium dihydrogencitrate, magnesium hydrogencitrate, magnesium citrate, magnesium phenoxide, magnesium salicylate, oxalic anhydride, malonic anhydride, succinic anhydride, maleic anhydride, phthalic anhydride, or any combination of non-oxidative breakers, and any combinations thereof. The hydrophilic monomer may be present in the polymer in a total amount from about 50 wt % to about 99.9 wt % of the polymer; and wherein the hydrophobic monomer may be present in the polymer in a total amount from about 0.01 wt % to about 50 wt % of the polymer. The polymer may be present in the fracturing fluid in a concentration of about 10 pptg to about 80 pptg. The proppant may be selected from the group consisting of: high-quality sand; particulate garnet; metal particulates; ceramic proppants; aluminum oxide; bauxite; bauxitic clay; kaolin; aluminosilicates; iron oxide, and other ores or minerals; cement; cement composites; ceramics; polymer composites containing particulate materials, such as nanoparticles; porous ceramics; porous organic materials; porous metals; low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof; and any combinations thereof.

Provided are systems for treating in a subterranean formation in accordance with the disclosure. An example system comprises a fracturing fluid comprising: a polymer comprising a hydrophobic monomer and a hydrophilic monomer; wherein the hydrophobic monomer comprises a monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acryl amide, pentadecyl (meth)acrylate, pentadecyl (meth)acryl amide, cetyl (meth)acrylate, cetyl (meth)acryl amide, oleyl (meth)acrylate, oleyl (meth)acrylamide, erucyl (meth)acrylate, erucyl (meth)acrylamide, and any combinations thereof; wherein the hydrophilic monomer comprises a monomer selected from the group consisting of acrylate, acrylate salts, acrylamide, 2-acrylamido-2-methylpropane sulfonic acid, 2-acrylamido-2-methylpropane sulfonic acid salts, and any combinations thereof. The fracturing fluid further comprises a proppant and an aqueous base fluid. The fracturing fluid does not comprise a crosslinker or an oxidative breaker. The system further comprises mixing equipment configured to mix the polymer, the aqueous base fluid, and the proppant. The system further comprises a pump fluidly coupled to a tubular extending into a wellbore penetrating the subterranean formation, wherein the tubular is configured to circulate or otherwise convey the fracturing fluid in the wellbore.

Additionally or alternatively, the system may include one or more of the following features individually or in combination. The system may further comprise a pad fluid comprising a caustic or acid selected from the group consisting of sodium hydroxide, potassium hydroxide, lithium hydroxide, cesium hydroxide, hydrochloric acid, hydrobromic acid, chloric acid, bromic acid, sulfurous acid, sulfuric acid, phosphorous acid, phosphoric acid, formic acid, acetic acid, propionic acid, acrylic acid, butyric acid, sec-butyric acid, methacrylic acid, pentanonic acid, lactic acid, oxalic acid, malonic acid, succinic acid, maleic acid, fumaric acid, benzoic acid, salicylic acid, phthalic acid, methanesulfonic acid, and any combinations thereof. The fracturing fluid may comprise a non-oxidative breaker selected from the group consisting of magnesium oxide, magnesium oxide/hydroxide, calcium oxide/hydroxide, polylactic acid, polyglycolic acid, sodium formate, sodium acetate, sodium propionate, sodium acrylate, sodium butyrate, sodium sec-butyrate, sodium crotonate, sodium methacrylate, sodium pentanoate, sodium lactate, sodium benzoate, mono-, or disodium oxalate, mono-, or disodium malonate, mono-, or disodium succinate, mono-, or disodium maleate, mono-, or disodium fumarate, mono-, or disodium phthalate, mono-, di-, or (tri)sodium phosphate, sodium bicarbonate, sodium carbonate, sodium bisulfide, sodium sulfide, sodium bisulfite, sodium sulfite, sodium hypochlorite, sodium chlorite, sodium fluoride, sodium silicate, sodium borate, borax, mono-, di-, or (tri)sodium citrate, mono-, di-, tri-, or tetrasodium EDTA, sodium phenoxide, sodium salicylate, potassium formate, potassium acetate, potassium propionate, potassium acrylate, potassium butyrate, potassium sec-butyrate, potassium crotonate, potassium methacrylate, potassium pentanoate, potassium lactate, potassium benzoate, mono-, or dipotassium oxalate, mono-, or dipotassium malonate, mono-, or dipotassium succinate, mono-, or dipotassium maleate, mono-, or dipotassium fumarate, mono-, or dipotassium phthalate, mono-, di-, or (tri)potassium phosphate, potassium bicarbonate, potassium carbonate, potassium bisulfide, potassium sulfide, potassium bisulfite, potassium sulfite, potassium hypochlorite, potassium chlorite, potassium fluoride, potassium silicate, potassium borate, mono-, di-, or (tri)potassium citrate, mono-, di-, tri-, tetrapotassium EDTA, potassium phenoxide, potassium salicylate, calcium formate, calcium acetate, calcium propionate, calcium acrylate, calcium butyrate, calcium sec-butyrate, calcium crotonate, calcium methacrylate, calcium pentanoate, calcium lactate, calcium benzoate, calcium hydrooxalate, calcium oxalate, calcium hydromalonate, calcium malonate, calcium hydrosuccinate, calcium succinate, calcium hydromaleate, calcium maleate, calcium hydrofumarate, calcium fumarate, calcium dihydrogencitrate, calcium hydrophthalate, calcium phthalate, calcium hydrogencitrate, calcium dihydrogenphosphate, calcium hydrogenphosphate, calcium bicarbonate, calcium bisulfide, calcium bisulfite, calcium hypochlorite, calcium chlorite, calcium borate, Ulexite, Colemanite, calcium phenoxide, calcium salicylate, magnesium formate, magnesium acetate, magnesium propionate, magnesium acrylate, magnesium butyrate, magnesium sec-butyrate, magnesium crotonate, magenesium methacrylate, magnesium pentanoate, magnesium lactate, magenesium benzoate, magesium hydrooxalate, magnesium oxalate, calcium hydromalonate, magnesium malonate, magnesium hydrosuccinate, magnesium succinate, magnesium hydromaleate, magnesium maleate, magnesium hydrofumarate, magnesium fumarate, magnesium hydrophthalate, magnesium phthalate, magnesium bicarbonate, magnesium bisulfide, magnesium bisulfite, magnesium sulfite, magnesium hypochlorite, magnesium chlorite, magnesium borate, magnesium dihydrogencitrate, magnesium hydrogencitrate, magnesium citrate, magnesium phenoxide, magnesium salicylate, oxalic anhydride, malonic anhydride, succinic anhydride, maleic anhydride, phthalic anhydride, or any combination of non-oxidative breakers, and any combinations thereof. The hydrophilic monomer may be present in the polymer in a total amount from about 50 wt % to about 99.9 wt % of the polymer; and wherein the hydrophobic monomer may be present in the polymer in a total amount from about 0.01 wt % to about 50 wt % of the polymer. The polymer may be present in the fracturing fluid in a concentration of about 10 pptg to about 80 pptg. The proppant may be selected from the group consisting of: high-quality sand; particulate garnet; metal particulates; ceramic proppants; aluminum oxide; bauxite; bauxitic clay; kaolin; aluminosilicates; iron oxide, and other ores or minerals; cement; cement composites; ceramics; polymer composites containing particulate materials, such as nanoparticles; porous ceramics; porous organic materials; porous metals; low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof; and any combinations thereof.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a subterranean formation, the method comprising:
   introducing a pad fluid into a wellbore penetrating the subterranean formation to create or enhance one or more fractures in the subterranean formation, the pad fluid comprising a first aqueous base fluid;
   introducing a first fracturing fluid into the fracture, the first fracturing fluid comprising:
   a polymer comprising a hydrophobic monomer and a hydrophilic monomer; wherein the hydrophobic monomer is n-hexyl (meth)acrylate; wherein the hydrophilic monomer is acrylamide;
   a proppant; and
   a second aqueous base fluid;

introducing a second fracturing fluid into the fracture to contact the first fracturing fluid, the second fracturing fluid comprising:
a caustic selected from the group consisting of sodium hydroxide, potassium hydroxide, lithium hydroxide, cesium hydroxide, and any combination thereof, and a third aqueous base fluid;
wherein the first fracturing fluid does not comprise a crosslinker or an oxidative breaker; and
allowing or causing to allow the first fracturing fluid to break upon exposure to the second fracturing fluid thereby settling the proppant in the fracture.

2. The method of claim 1, wherein the pad fluid comprises a brine.

3. The method of claim 1, wherein the pad fluid comprises a caustic or acid selected from the group consisting of sodium hydroxide, potassium hydroxide, lithium hydroxide, cesium hydroxide, hydrochloric acid, hydrobromic acid, chloric acid, bromic acid, sulfurous acid, sulfuric acid, phosphorous acid, phosphoric acid, formic acid, acetic acid, propionic acid, acrylic acid, butyric acid, sec-butyric acid, methacrylic acid, crotonic acid, pentanonic acid, lactic acid, oxalic acid, malonic acid, succinic acid, maleic acid, benzoic acid, salicylic acid, phthalic acid, methanesulfonic acid, and any combinations thereof.

4. The method of claim 1, wherein the first fracturing fluid comprises a non-oxidative breaker selected from the group consisting of magnesium oxide, magnesium oxide/hydroxide, calcium oxide/hydroxide, polylactic acid, polyglycolic acid, sodium formate, sodium acetate, sodium propionate, sodium acrylate, sodium butyrate, sodium sec-butyrate, sodium crotonate, sodium methacrylate, sodium pentanoate, sodium lactate, sodium benzoate, mono-, or disodium oxalate, mono-, or disodium malonate, mono-, or disodium succinate, mono-, or disodium maleate, mono-, or disodium fumarate, mono-, or disodium phthalate, mono-, di-, or (tri)sodium phosphate, sodium bicarbonate, sodium carbonate, sodium bisulfide, sodium sulfide, sodium bisulfite, sodium sulfite, sodium hypochlorite, sodium chlorite, sodium fluoride, sodium silicate, sodium borate, borax, mono-, di-, or (tri)sodium citrate, mono-, di-, tri-, or tetrasodium EDTA, sodium phenoxide, sodium salicylate, potassium formate, potassium acetate, potassium propionate, potassium acrylate, potassium butyrate, potassium sec-butyrate, potassium crotonate, potassium methacrylate, potassium pentanoate, potassium lactate, potassium benzoate, mono-, or dipotassium oxalate, mono-, or dipotassium malonate, mono-, or dipotassium succinate, mono-, or dipotassium maleate, mono-, or dipotassium fumarate, mono-, or dipotassium phthalate, mono-, di-, or (tri)potassium phosphate, potassium bicarbonate, potassium carbonate, potassium bisulfide, potassium sulfide, potassium bisulfite, potassium sulfite, potassium hypochlorite, potassium chlorite, potassium fluoride, potassium silicate, potassium borate, mono-, di-, or (tri)potassium citrate, mono-, di-, tri-, tetrapotassium EDTA, potassium phenoxide, potassium salicylate, calcium formate, calcium acetate, calcium propionate, calcium acrylate, calcium butyrate, calcium sec-butyrate, calcium crotonate, calcium methacrylate, calcium pentanoate, calcium lactate, calcium benzoate, calcium hydrooxalate, calcium oxalate, calcium hydromalonate, calcium malonate, calcium hydrosuccinate, calcium succinate, calcium hydromaleate, calcium maleate, calcium hydrofumarate, calcium fumarate, calcium dihydrogencitrate, calcium hydrophthalate, calcium phthalate, calcium hydrogencitrate, calcium dihydrogenphosphate, calcium hydrogenphosphate, calcium bicarbonate, calcium bisulfide, calcium bisulfite, calcium hypochlorite, calcium chlorite, calcium borate, Ulexite, Colemanite, calcium phenoxide, calcium salicylate, magnesium formate, magnesium acetate, magnesium propionate, magnesium acrylate, magnesium butyrate, magnesium sec-butyrate, magnesium crotonate, magenesium methacrylate, magnesium pentanoate, magnesium lactate, magenesium benzoate, magesium hydrooxalate, magnesium oxalate, calcium hydromalonate, magnesium malonate, magnesium hydrosuccinate, magnesium succinate, magnesium hydromaleate, magnesium maleate, magnesium hydrofumarate, magnesium fumarate, magnesium hydrophthalate, magnesium phthalate, magnesium bicarbonate, magnesium bisulfide, magnesium bisulfite, magnesium sulfite, magnesium hypochlorite, magnesium chlorite, magnesium borate, magnesium dihydrogencitrate, magnesium hydrogencitrate, magnesium citrate, magnesium phenoxide, magnesium salicylate, oxalic anhydride, malonic anhydride, succinic anhydride, maleic anhydride, phthalic anhydride, or any combination of non-oxidative breakers, and any combinations thereof.

5. The method of claim 1, wherein the proppant is suspended in the first fracturing fluid when the first fracturing fluid has a first viscosity; wherein the proppant settles out of the first fracturing fluid when the first fracturing fluid has a second viscosity; and wherein the allowing or causing to allow the first fracturing fluid to break comprises transitioning from the first viscosity to the second viscosity in a time of less than 24 hours.

6. The method of claim 5, wherein the first viscosity is a viscosity of 100 cP or greater and the second viscosity is a viscosity of 30 cP or less at shear rate of 100 l/s at 70° F.

7. The method of claim 1, wherein the hydrophilic monomer is present in the polymer in a total amount from about 50 wt % to about 99.9 wt % of the polymer; and wherein the hydrophobic monomer is present in the polymer in a total amount from about 0.01 wt % to about 50 wt % of the polymer.

8. The method of claim 1, wherein the polymer is present in the first fracturing fluid in a concentration of about 10 pptg to about 80 pptg.

9. The method of claim 1, wherein the proppant is selected from the group consisting of: high-quality sand; particulate garnet; metal particulates; ceramic proppants; aluminum oxide; bauxite; bauxitic clay; kaolin; alumino-silicates; iron oxide, and other ores or minerals; cement; cement composites; ceramics; polymer composites containing particulate materials, such as nanoparticles; porous ceramics; porous organic materials; porous metals; low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof; and any combinations thereof.

10. A system for treating a subterranean formation, the system comprising:
a first fracturing fluid comprising:
a polymer comprising a hydrophobic monomer and a hydrophilic monomer; wherein the hydrophobic monomer comprises a monomer selected from the group consisting of is n-hexyl (meth)acrylate; wherein the hydrophilic monomer is acrylamide;
a proppant; and
an aqueous base fluid;
wherein the first fracturing fluid does not comprise a crosslinker or an oxidative breaker;
a second fracturing fluid configured to break the first fracturing fluid upon contacting the first fracturing fluid, the second fracturing comprising:

a caustic selected from the group consisting of sodium hydroxide, potassium hydroxide, lithium hydroxide, cesium hydroxide, and any combination thereof, and a third aqueous base fluid;

mixing equipment configured to mix the polymer, the aqueous base fluid, and the proppant; and a pump fluidly coupled to a tubular extending into a wellbore penetrating the subterranean formation, wherein the tubular is configured to circulate or otherwise convey the first and second fracturing fluids in the wellbore.

11. The system of claim 10, further comprising a pad fluid comprising a caustic or acid selected from the group consisting of sodium hydroxide, potassium hydroxide, lithium hydroxide, cesium hydroxide, hydrochloric acid, hydrobromic acid, chloric acid, bromic acid, sulfurous acid, sulfuric acid, phosphorous acid, phosphoric acid, formic acid, acetic acid, propionic acid, acrylic acid, butyric acid, sec-butyric acid, methacrylic acid, pentanonic acid, lactic acid, oxalic acid, malonic acid, succinic acid, maleic acid, fumaric acid, benzoic acid, salicylic acid, phthalic acid, methanesulfonic acid, and any combinations thereof.

12. The system of claim 10, wherein the first fracturing fluid comprises a non-oxidative breaker selected from the group consisting of magnesium oxide, magnesium oxide/hydroxide, calcium oxide/hydroxide, polylactic acid, polyglycolic acid, sodium formate, sodium acetate, sodium propionate, sodium acrylate, sodium butyrate, sodium sec-butyrate, sodium crotonate, sodium methacrylate, sodium pentanoate, sodium lactate, sodium benzoate, mono-, or disodium oxalate, mono-, or disodium malonate, mono-, or disodium succinate, mono-, or disodium maleate, mono-, or disodium fumarate, mono-, or disodium phthalate, mono-, di-, or (tri)sodium phosphate, sodium bicarbonate, sodium carbonate, sodium bisulfide, sodium sulfide, sodium bisulfite, sodium sulfite, sodium hypochlorite, sodium chlorite, sodium fluoride, sodium silicate, sodium borate, borax, mono-, di-, or (tri)sodium citrate, mono-, di-, tri-, or tetrasodium EDTA, sodium phenoxide, sodium salicylate, potassium formate, potassium acetate, potassium propionate, potassium acrylate, potassium butyrate, potassium sec-butyrate, potassium crotonate, potassium methacrylate, potassium pentanoate, potassium lactate, potassium benzoate, mono-, or dipotassium oxalate, mono-, or dipotassium malonate, mono-, or dipotassium succinate, mono-, or dipotassium maleate, mono-, or dipotassium fumarate, mono-, or dipotassium phthalate, mono-, di-, or (tri)potassium phosphate, potassium bicarbonate, potassium carbonate, potassium bisulfide, potassium sulfide, potassium bisulfite, potassium sulfite, potassium hypochlorite, potassium chlorite, potassium fluoride, potassium silicate, potassium borate, mono-, di-, or (tri)potassium citrate, mono-, di-, tri-, tetrapotassium EDTA, potassium phenoxide, potassium salicylate, calcium formate, calcium acetate, calcium propionate, calcium acrylate, calcium butyrate, calcium sec-butyrate, calcium crotonate, calcium methacrylate, calcium pentanoate, calcium lactate, calcium benzoate, calcium hydrooxalate, calcium oxalate, calcium hydromalonate, calcium malonate, calcium hydrosuccinate, calcium succinate, calcium hydromaleate, calcium maleate, calcium hydrofumarate, calcium fumarate, calcium dihydrogencitrate, calcium hydrophthalate, calcium phthalate, calcium hydrogencitrate, calcium dihydrogenphosphate, calcium hydrogenphosphate, calcium bicarbonate, calcium bisulfide, calcium bisulfite, calcium hypochlorite, calcium chlorite, calcium borate, Ulexite, Colemanite, calcium phenoxide, calcium salicylate, magnesium formate, magnesium acetate, magnesium propionate, magnesium acrylate, magnesium butyrate, magnesium sec-butyrate, magnesium crotonate, magenesium methacrylate, magnesium pentanoate, magnesium lactate, magenesium benzoate, magesium hydrooxalate, magnesium oxalate, calcium hydromalonate, magnesium malonate, magnesium hydrosuccinate, magnesium succinate, magnesium hydromaleate, magnesium maleate, magnesium hydrofumarate, magnesium fumarate, magnesium hydrophthalate, magnesium phthalate, magnesium bicarbonate, magnesium bisulfide, magnesium bisulfite, magnesium sulfite, magnesium hypochlorite, magnesium chlorite, magnesium borate, magnesium dihydrogencitrate, magnesium hydrogencitrate, magnesium citrate, magnesium phenoxide, magnesium salicylate, oxalic anhydride, malonic anhydride, succinic anhydride, maleic anhydride, phthalic anhydride, or any combination of non-oxidative breakers, and any combinations thereof.

13. The system of claim 10, wherein the hydrophilic monomer is present in the polymer in a total amount from about 50 wt % to about 99.9 wt % of the polymer; and wherein the hydrophobic monomer is present in the polymer in a total amount from about 0.01 wt % to about 50 wt % of the polymer.

14. The system of claim 10, wherein the polymer is present in the first fracturing fluid in a concentration of about 10 pptg to about 80 pptg.

* * * * *